US006667726B1

(12) United States Patent
Damiani et al.

(10) Patent No.: US 6,667,726 B1
(45) Date of Patent: Dec. 23, 2003

(54) VEHICLE DISPLAY DEVICE

(75) Inventors: Sergio Damiani, Turin (IT); Enrica Deregibus, Turin (IT); Norberto Dosio, Turin (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 09/234,137

(22) Filed: Jan. 19, 1999

(51) Int. Cl.[7] .................................................. G09G 5/00
(52) U.S. Cl. .............................. 345/1.1; 340/461; 701/1
(58) Field of Search ........................... 340/461, 815.41, 340/980, 995.1; 701/1, 117, 208; 455/158.4; 364/443; 345/87, 1.1, 634, 635, 637

(56) References Cited

U.S. PATENT DOCUMENTS

| 4,736,198 A | * | 4/1988 | Tokuyama et al. ........... 340/701 |
| 5,239,700 A | * | 8/1993 | Guenther et al. ......... 455/158.4 |
| 5,559,707 A | * | 9/1996 | DeLorme et al. ........... 364/443 |
| 5,757,268 A | * | 5/1998 | Toffolo et al. ............... 340/461 |
| 5,794,164 A | * | 8/1998 | Beckert .......................... 701/1 |
| 5,812,959 A | * | 9/1998 | Froeburg et al. ............. 701/117 |
| 5,819,201 A | * | 10/1998 | DeGraaf ..................... 701/208 |
| 5,872,433 A | * | 2/1999 | Sakai .......................... 318/139 |
| 5,949,345 A | * | 9/1999 | Beckert et al. ........ 340/815.41 |

FOREIGN PATENT DOCUMENTS

| DE | 4218804 | 12/1993 |
| EP | 0672892 | 9/1995 |
| EP | 0704675 | 4/1996 |
| FR | 2667026 | 3/1992 |

OTHER PUBLICATIONS

Abstract of DE 4218804 dated Dec. 9, 1993.
Abstract of FR 2667026 dated Mar. 27, 1992.

* cited by examiner

Primary Examiner—Dennis-Doon Chow
(74) Attorney, Agent, or Firm—Ladas & Parry

(57) ABSTRACT

The display device has a pair of liquid crystal, colour display units fitted to the dashboard of the vehicle to display information; a memory; a "track-ball" data selection unit adjacent to the gear lever; and a processing unit cooperating with the memory and the data selection unit, and controlling the display units. In particular, by means of the "track-ball" data selection unit, the driver of the vehicle may change and freely adapt to his own requirements information display parameters such as type, size, colour and style of representation, by selecting from a number of items in a menu shown on the display units and memorized in the memory.

33 Claims, 6 Drawing Sheets

VEHICLE DISPLAY DEVICE

BACKGROUND OF THE INVENTION

The present invention relates to a vehicle display device.

As is known, currently used vehicle display devices comprise analog or digital on-vehicle instruments normally indicating quantities such as vehicle speed, engine speed, fuel level, etc.; and a number of optical indicators showing various vehicle states, such as lights on, engine oil level, cooling water temperature, etc.

Most analog instruments comprise, for each display quantity, a needle gauge showing the value of the quantity on a graduated scale normally comprising a number of numeric characters, the size, and style of which are determined at the instrument design stage, while optical indicators normally comprise standard rear-lighted graphic symbols, each indicating a respective vehicle state.

Most digital instruments comprise, for each display quantity, an indicator comprising an LCD (Liquid Crystal Display) or a number of light-emitting elements (LEDs), which may be illuminated selectively to form a numeric character indicating the value of the quantity in a respective unit of measurement, or sequentially to indicate the level of the quantity on a graduated scale similar to that of analog instruments.

The instrument character size and style and the size of the optical indicator graphic symbols are not always suitable in terms of visibility by the driver, whose eyesight may be impaired by disease or age, and which normally worsens with advancing years.

Moreover, the colour and background contrast of the characters and graphic symbols do not always allow of immediate interpretation by the driver in different outside light conditions, as in strong sunlight.

Also, as the on-vehicle instruments and optical indicators are defined at the vehicle design stage, currently used display devices do not permit later extensions to cater to functions not provided for at the device design stage, such as navigational systems indicating the on-road location of the vehicle, road traffic indicating systems, etc.

Known display devices therefore fail to adapt to the personal visual requirements of the driver, and to allow of later additions to accommodate functions not provided for at the vehicle design stage.

SUMMARY OF THE INVENTION

It is an object of the present invention to provide a display device designed to overcome the limitations typically associated with known devices.

According to the present invention, there is provided a vehicle display device comprising display means for displaying information and fittable to an instrument panel of a vehicle; characterized in that said display means may be modified as regards information display parameters comprising display type, size, colour and style; said display device also being characterized by comprising control means for controlling said display means and modifying at least one of said display parameters.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

The present invention is based on the principle of replacing traditional on-vehicle analog or digital instruments and optical indicators with a display device comprising one or more screens, which may be modified as regards display parameters, are installed on the vehicle instrument panel, and on which the instrument gauges and optical indicators are represented graphically.

When the vehicle is stopped, each instrument gauge and each optical indicator shown on the screens may be adapted freely according to the preference of the driver, using a "mouse" adjacent to the gear lever, and which provides for selecting from various menu items on the screens, and so customizing the information displayed.

More specifically, the "mouse" provides not only for selecting which gauges and which optical indicators to display, but also for modifying the display parameters of each, such as display type, size, colour and style.

For example, it is possible to display the speedometer and engine speed indicator or the speedometer and clock, etc.; a digital as opposed to analog engine speed indicator; large as opposed to small speedometer and engine speed indicator characters; a red as opposed to green speedometer scale; and so on for each display parameter of any of the information shown.

Figure 1:
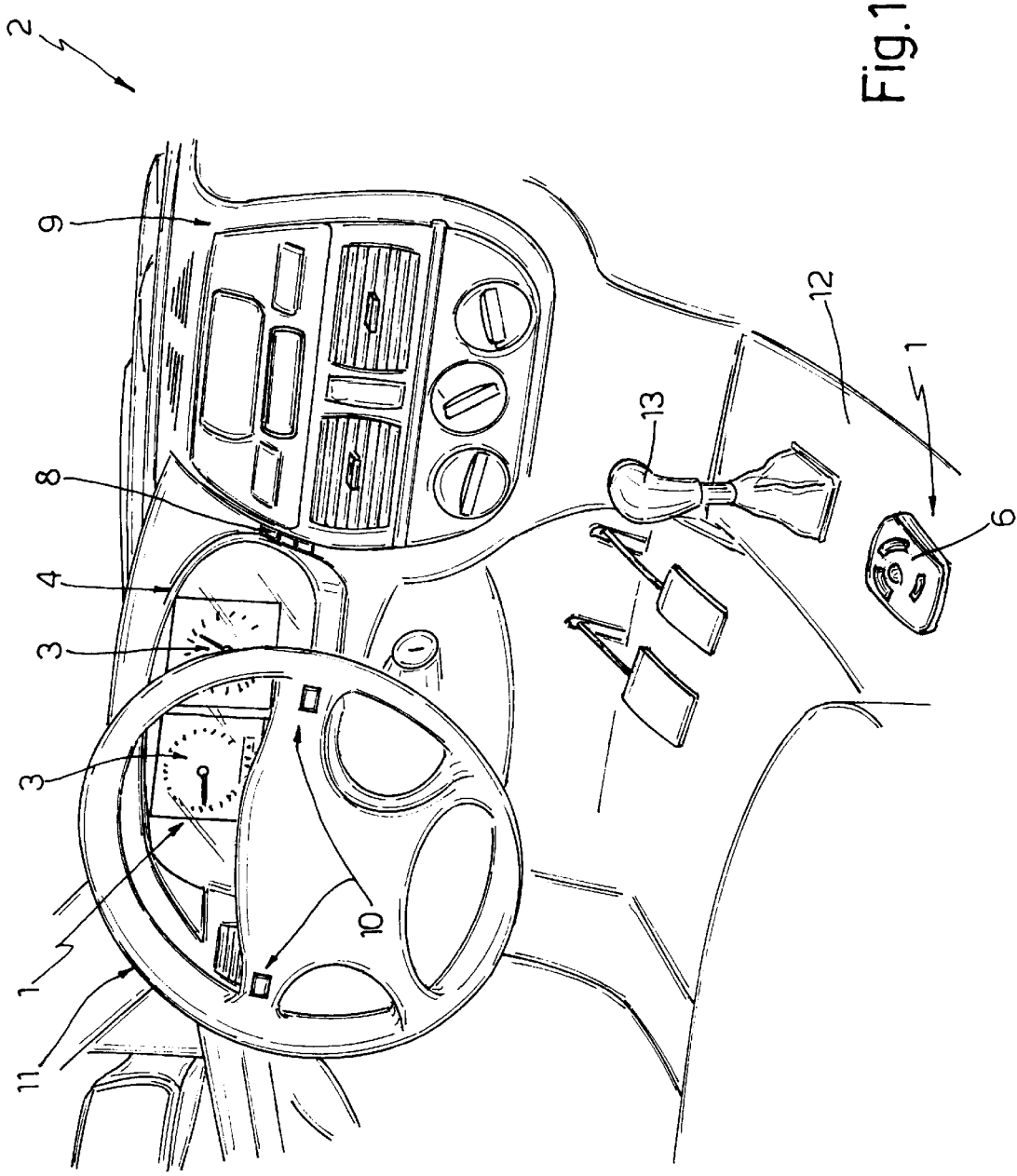
FIG. 1 shows a schematic view of a vehicle featuring the display device according to the present invention.
Figure 2:
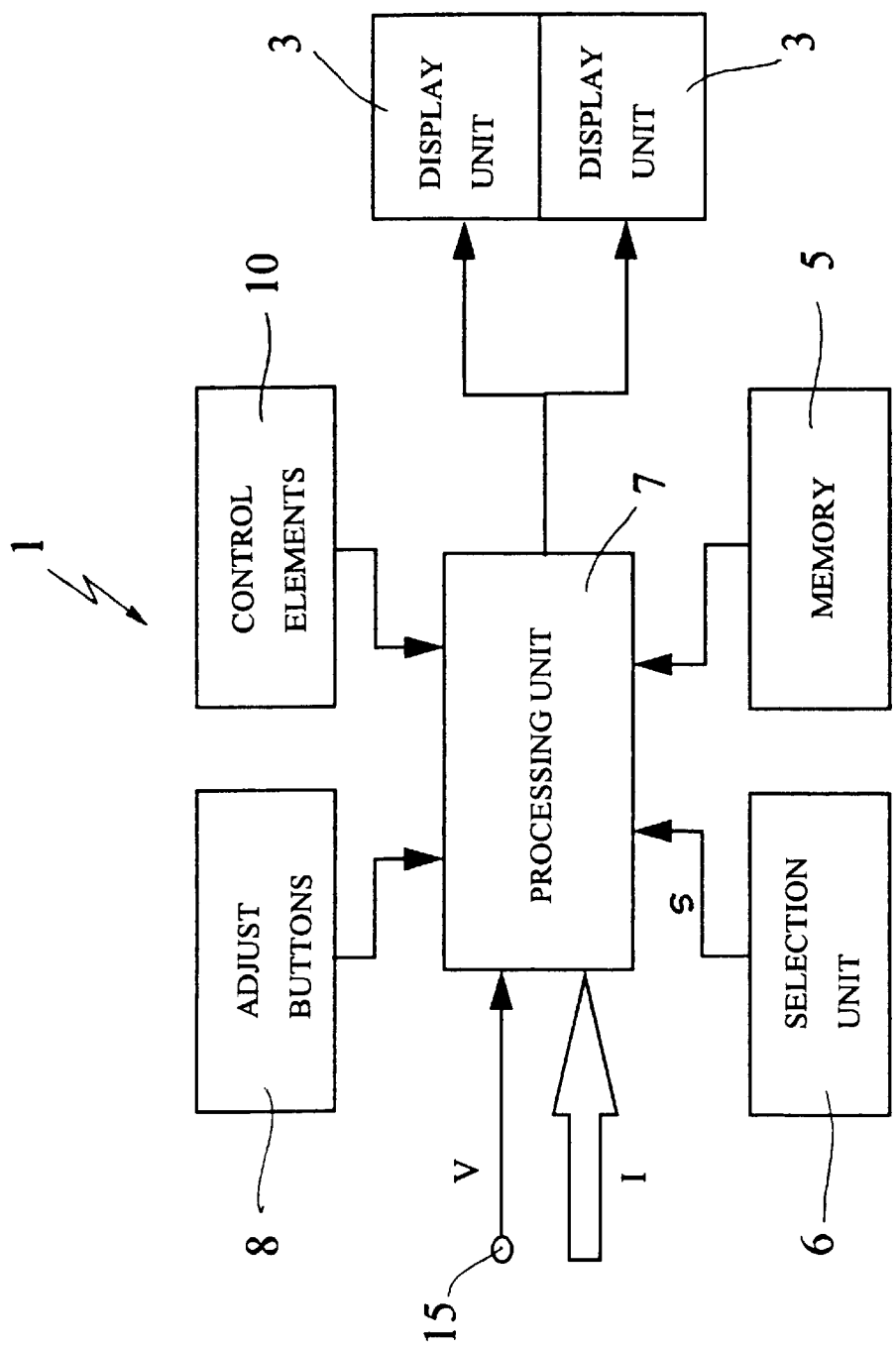
FIG. 2 shows a block diagram of the FIG. 1 device.

Number 1 in FIGS. 1 and 2 indicates a display device in accordance with the present invention. More specifically, FIG. 1 shows part of the passenger compartment of a vehicle 2 featuring display device 1, while FIG. 2 shows a block diagram of display device 1.

Figure 3:
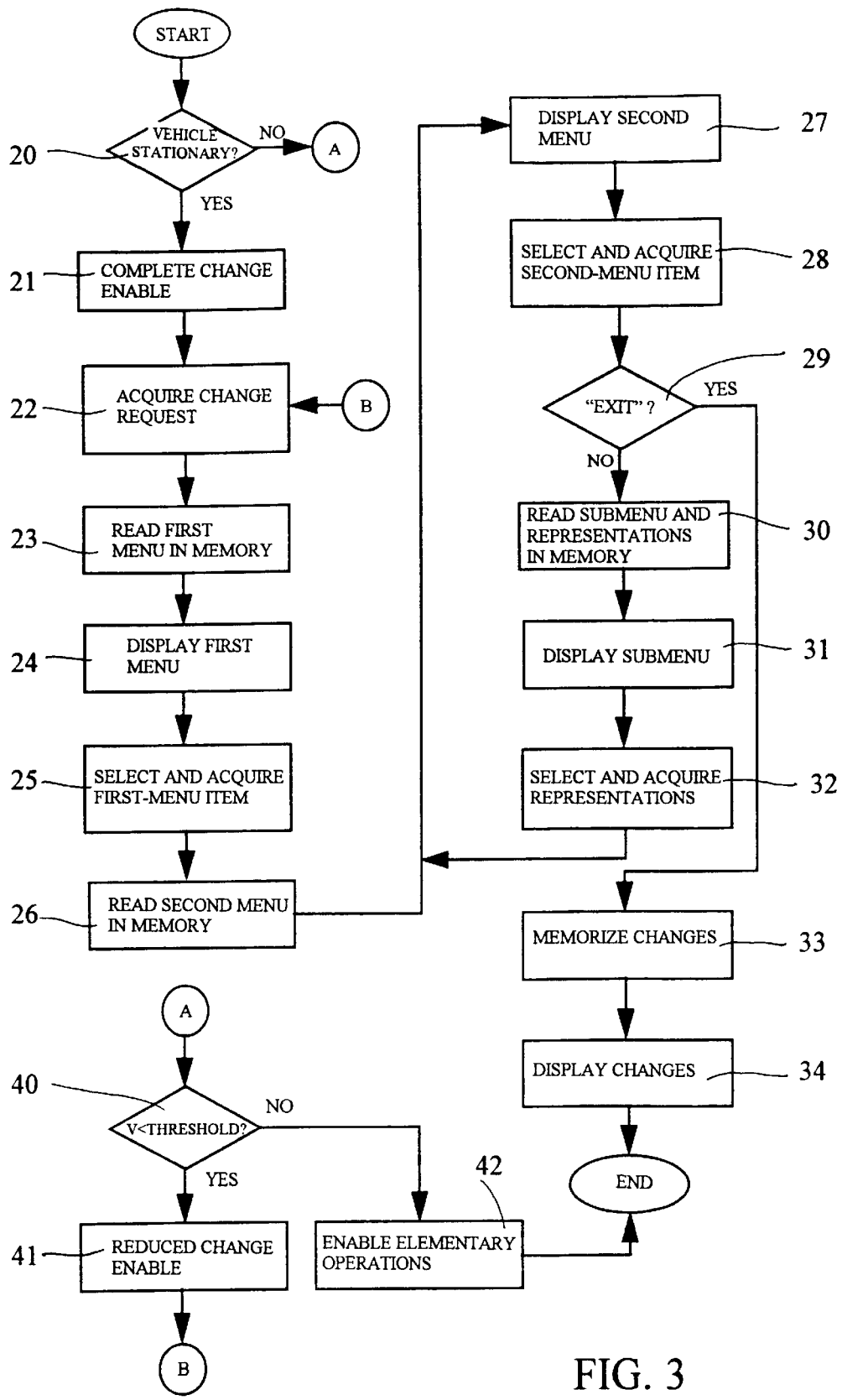
FIG. 3 shows a flow chart of operations performed by the FIG. 2 display device.

As shown in FIGS. 1 and 2, display device 1 comprises a pair of liquid crystal, colour display units 3 on the dashboard 4 of vehicle 2; a memory 5 containing a number of graphic representations of each instrument gauge and each optical indicator; a data selection unit 6 generating a number of selection signals S indicating the selections made, and by which the driver selects the instrument gauge and optical indicator representations for display; and a processing unit 7 connected to memory 5 and data selection unit 6, and which provides for performing the operations described in detail with reference to FIG. 3 to enable the driver to modify the instrument and optical indicator representations on display units 3.

More specifically, for each instrument gauge and each optical indicator that can be shown on display units 3, memory 5 stores a corresponding number of predetermined gauge or optical indicator representations obtainable by varying the aforementioned display parameters, and which are shown on display units 3.

Data selection unit 6 comprises a "track-ball mouse" fitted to the central tunnel 12 of vehicle 2 supporting the gear lever 13, and located behind gear lever 13 in an easily accessible position by the driver; and the pair of liquid crystal display units 3 comprise respective adjacent liquid crystal screens on dashboard 4 of vehicle 2, each with a substantially rectangular display surface of about 5.7 inches in diagonal.

Display device 1 also comprises a number of push-buttons 8 located on the instrument panel 9 of vehicle 2, adjacent to dashboard 4 of vehicle 2, and connected to processing unit 7 to enable the driver to make normally infrequent adjustments, such as resetting the odometer, adjusting the brightness of the graphic representations on display units 3, etc.

Display device 1 also comprises further control elements 10, e.g. toggle switches, push-buttons, knobs, etc., located on the steering wheel 11 of vehicle 2 and connected to processing unit 7 to enable the driver, in particular running conditions of vehicle 2, to select and activate elementary functions of vehicle 2, as described in detail later on.

Processing unit 7 also receives a moving-vehicle signal, e.g. a speed signal V indicating the speed of vehicle 2, generated by an engine central control unit 15; and a number of information signals I indicating the state of vehicle 2 and generated by respective sensors (not shown) on vehicle 2.

As described in detail later on, processing unit 7 enables different sets of driver-performable operations according to the value of speed signal V, and, on the basis of information signals I, provides for real-time changing the graphic representations of the instrument gauges and optical indicators shown on display units 3.

Purely by way of example, information signals I may comprise an engine speed signal, a fuel level signal, an engine oil level signal, a cooling fluid temperature signal, etc.; and processing unit 7 uses these signals to modify the instantaneous vehicle speed, engine speed, fuel level readings, etc. on display units 3.

With reference to FIG. 3, a description will now be given of the operations performed by the driver of vehicle 2, and those performed accordingly by processing unit 7 to adapt the information shown on display units 3.

To begin with, processing unit 7 determines, on the basis of speed signal V, whether vehicle 2 is stationary (block 20).

If vehicle 2 is stationary (YES output of block 20), processing unit 7 enables a change in representation of the currently displayed instrument gauges and optical indicators (block 21). Conversely, if vehicle 2 is moving (NO output of block 20), processing unit 7 disables the above operations, and only enables a small number of operations as described in detail later on with reference to blocks 40–42.

The purpose of determining whether vehicle 2 is stationary and disabling any change in representation of the instrument gauges and optical indicators is to avoid distracting the driver when the vehicle is moving and so endangering his own safety and that of other road users. When the vehicle is moving, in fact, only a small number of operations, which do not involve distracting the driver's attention from the road, are permitted.

If change is enabled, the driver of vehicle 2 presses a button on "mouse" 6 to inform processing unit 7 of his intention to change the representation of the currently displayed instrument gauges and optical indicators, and "mouse" 6 generates a first selection signal S which is acquired by processing unit 7 (block 22).

Processing unit 7 then reads in memory 5 a first set of data associated with first selection signal S, namely a first menu containing a number of items indicating which instrument gauges and which optical indicators may be changed, and what further information may be displayed on display units 3 (block 23). For example, the first menu may comprise items such as "speedometer", "engine speed indicator", "fuel level indicator", "water temperature indicator", "oil pressure indicator", etc.

Processing unit 7 then displays the first menu on display units 3 (block 24).

At this point, to indicate which currently displayed instrument gauge or optical indicator is to be changed, the driver selects one of the items in the first menu using "mouse" 6, and the selection is acquired by processing unit 7 (block 25). More specifically, "mouse" 6 generates a second selection signal S, which is acquired by processing unit 7.

Processing unit 7 then reads in memory 5 a second set of data associated with second selection signal S, i.e. with the instrument gauge or optical indicator selected by the driver. More specifically, processing unit 7 reads in memory 5 a second menu containing a number of items, each indicating a respective changeable display parameter (block 26).

Processing unit 7 then displays on a first of display units 3 the current representation of the instrument gauge or optical indicator selected in block 25, and displays the second menu on a second of display units 3 (block 27).

Figure 4:
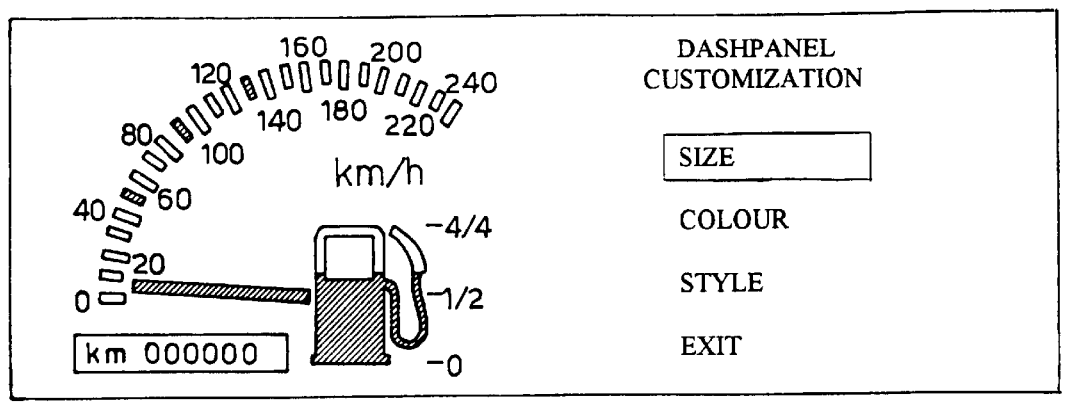
FIGS. 4–12 show various vehicle instrument representations obtainable using the device according to the present invention.
Figure 5:
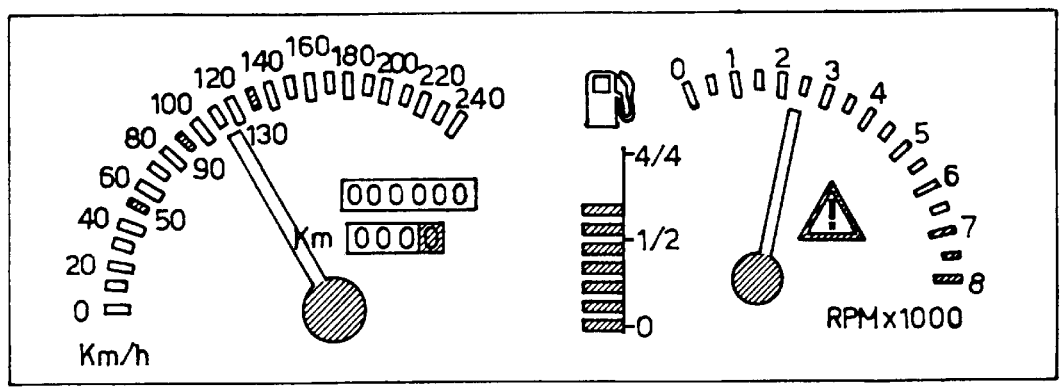
Figure 6:
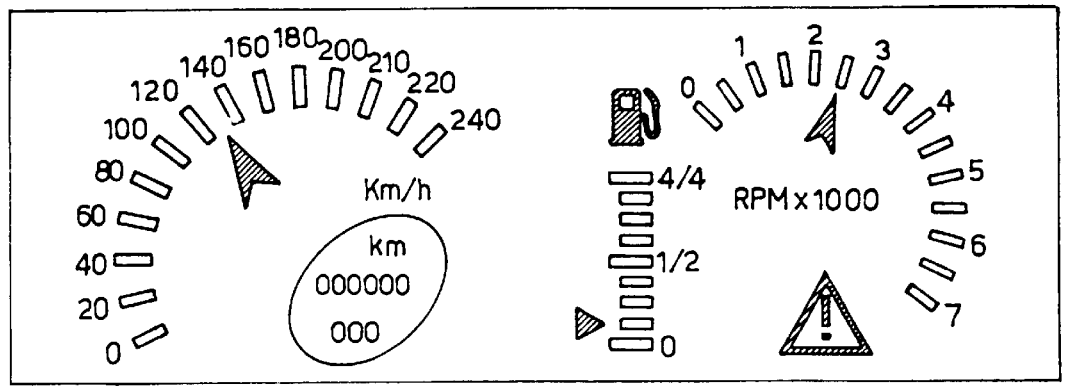
Figure 7:
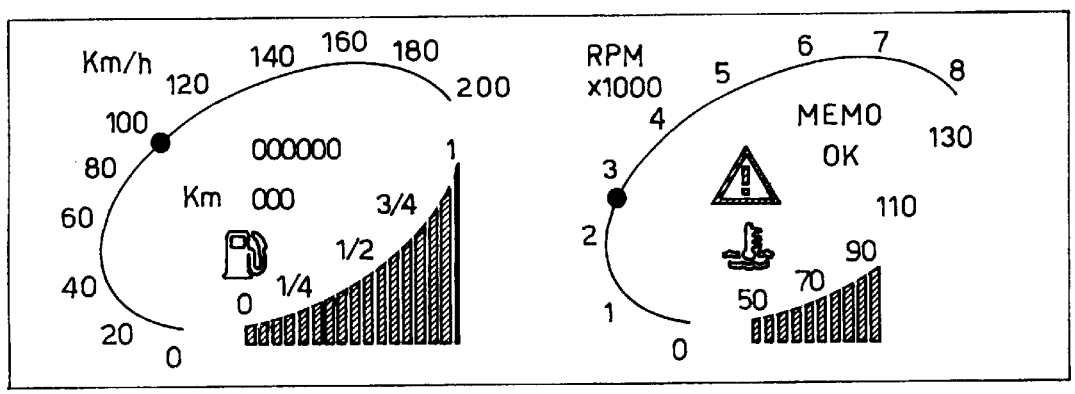
Figure 8:
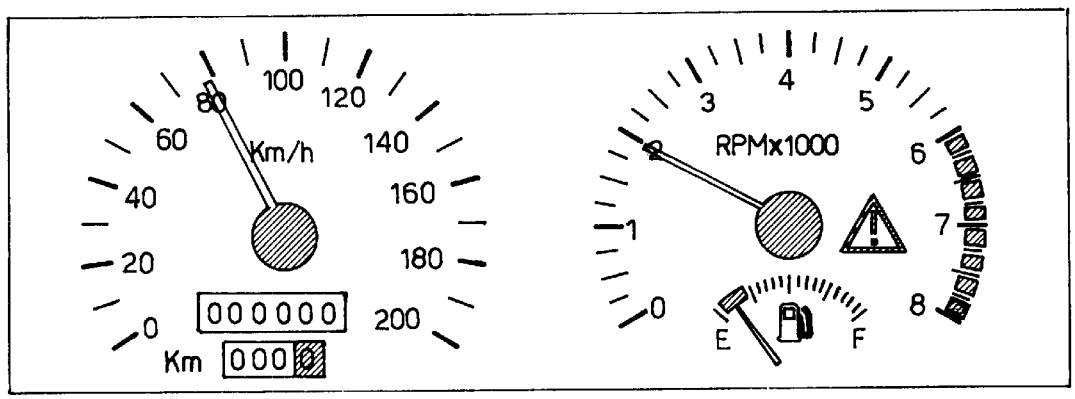
Figure 9:
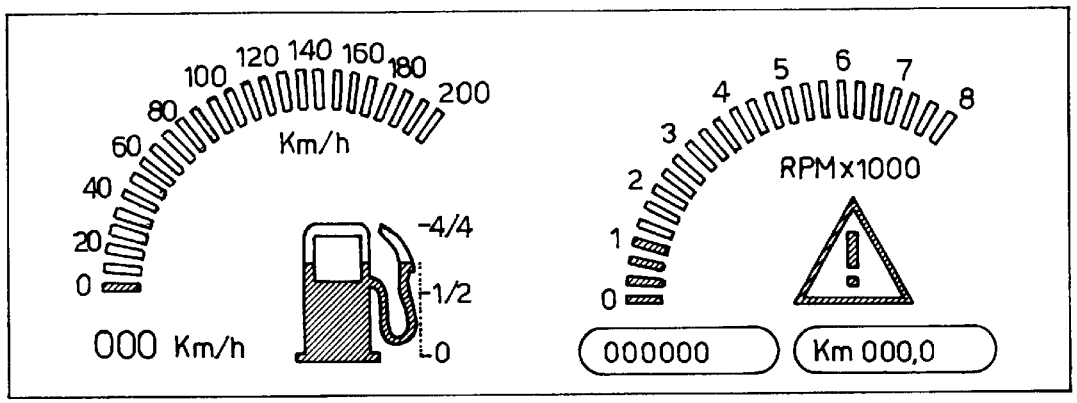
Figure 10:
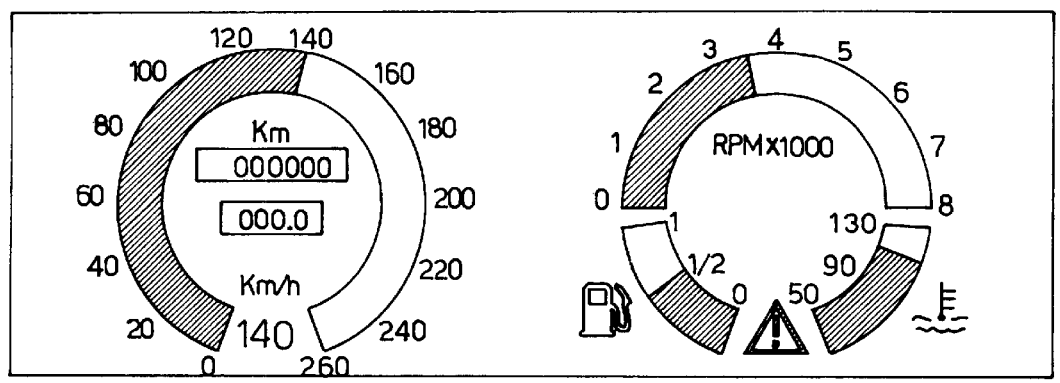
Figure 11:
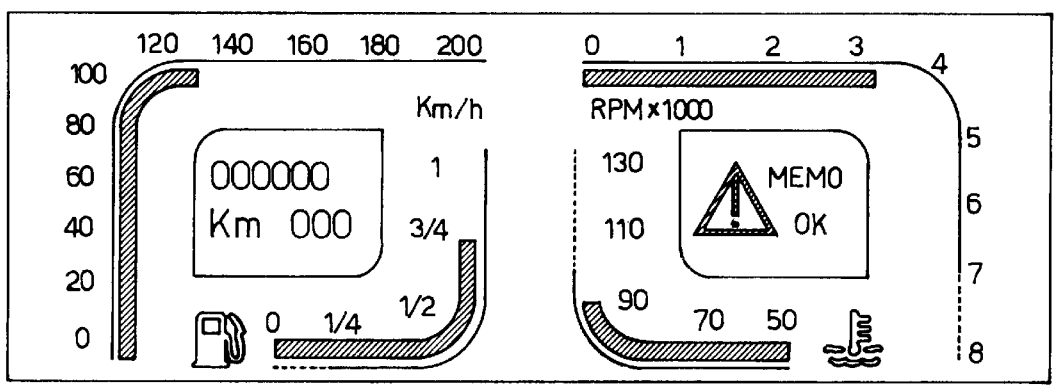
Figure 12:
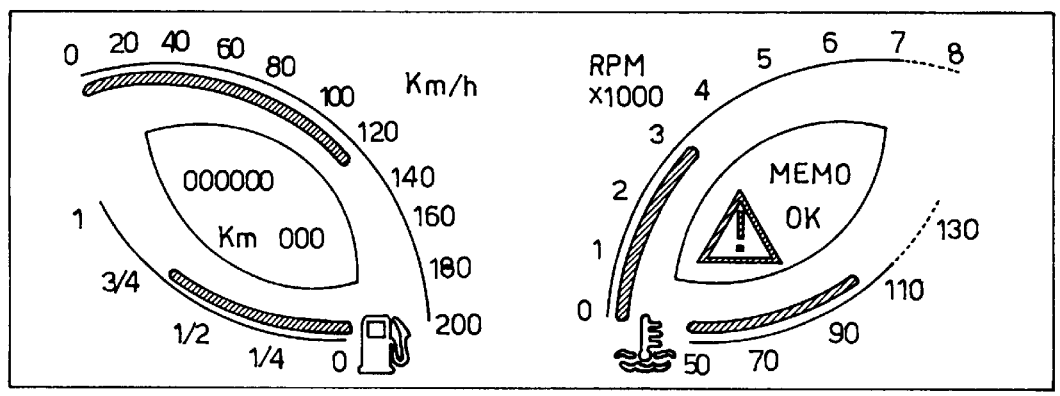

FIG. 4 shows an example of what is displayed on display units 3 on the left, a speedometer and fuel level indicator; and on the right, the second menu.

As shown in FIG. 4, the second menu comprises the items "size", "colour", "style" and "exit" respectively indicating the possibility of changing the size of the instrument gauge and optical indicator display characters, changing the colour and background colour of the instrument gauges and optical indicators, changing the style with which the gauges and indicators are represented, and terminating the change operations and so memorizing and displaying the changes made.

At this point, to indicate which display parameter is to be changed, the driver selects one of the items in the second menu using "mouse" 6, and the selection is acquired by processing unit 7 (block 28). More specifically, "mouse" 6 generates a third selection signal S which is acquired by processing unit 7.

Processing unit 7 then determines which item in the second menu has been selected (block 29).

If the driver has selected the "exit" item (YES output of block 29), block 29 goes on to a block 33 described in detail later on. Conversely, if the driver has selected one of the other items (NO output of block 29), processing unit 7 reads in memory 5 a third set of data associated with third selection signal S, i.e. with the display parameter selected by the driver. More specifically, processing unit 7 reads in memory 5 a submenu containing a number of items, each indicating a respective operation to be performed; and a number of predetermined representations of the selected gauge or optical indicator, which may be obtained by varying the selected display parameter (block 30).

Processing unit 7 then displays the submenu on the second display unit 3 (block 31).

The submenu comprises the items "another" and "exit", indicating the possibility of selecting one of the predetermined representations of the selected gauge or optical indicator, obtainable by varying the selected display parameter, and the possibility of terminating the change operations relative to the selected display parameter and switching back to the second menu.

The submenu is so organized that, each time "another" is selected by the driver, the first display unit 3 displays a different representation of the gauge or optical indicator, and, by repeatedly selecting the same item in the submenu, the graphic representations are displayed cyclically one after the other.

Using "mouse" 6, the driver therefore selects the desired graphic representation of the gauge or optical indicator by repeatedly selecting the "another" item in the submenu, and then selects "exit"; and processing unit 7 acquires the graphic representation of the gauge or optical indicator selected by the driver (block 32). More specifically, "mouse" 6 generates a fourth selection signal S which is acquired by processing unit 7.

When "exit" is selected in the submenu, operation commences once more from block 27, in which processing unit 7 displays the second menu.

At this point, using "mouse" 6, the driver may select "exit" in the second menu to terminate any further change in the display parameters of the selected instrument gauge or optical indicator, or select one of the other items to change a further display parameter of the instrument gauge or optical indicator.

If one of the display parameter items in the second menu is selected, operation commences once more from block 30. Conversely, if "exit" is selected, processing unit 7 memorizes in memory 5 the graphic representations selected by the driver (block 33) and displays the representations on display units 3 (block 34).

Obviously, if "exit" is the first item selected by the driver, i.e. if no changes are made, the previous representations memorized in memory 5 are left unchanged and displayed once more.

The operations performed in blocks 22–34 may be repeated for each instrument gauge and each optical indicator to be changed.

Alternatively, the first menu may also comprise an "exit" item, in which case, the first menu is displayed when "exit" is selected in the second menu, and the driver may either select "exit" in the first menu to terminate any further change and display the selected representations, or select another item in the first menu relative to another instrument gauge or another optical indicator to be changed, and so repeat the operations in blocks 26–34.

FIGS. 5–12 show just some of the instrument gauge and optical indicator graphic representations obtainable using display device 1 according to the present invention, and which, as can be seen, show analog, digital, and combined analog-digital instruments. The instruments and indicators displayed may comprise any combination of the gauges and indicators shown in FIGS. 5–12, as well as others not shown, the only limitation being that, for obvious reasons involving the safety of vehicle 2, certain gauges or indicators, such as the speedometer or the fault indicator on vehicle 2, cannot be eliminated from the display.

As stated, the operations in blocks 22–34 are only performed if vehicle 2 is stationary (YES output of block 20).

If vehicle 2 is moving (NO output of block 20), processing unit 7, as stated, disables any change in representation of the instrument gauges and optical indicators, and only enables a small number of operations which do not distract the driver's attention from the road (block 40).

The operations performed by processing unit 7 when vehicle 2 is moving commence by determining whether the speed of vehicle 2 is below a predetermined threshold value (block 40).

If the speed of vehicle 2 is below the threshold value (YES output of block 40), processing unit 7 enables only a small number of operations to avoid distracting the driver when the vehicle is moving (block 41). Block 41 goes on to block 22, and the operations in blocks 22–34, which will not be described again for the sake of simplicity, are repeated. It should be pointed out, however, that the operations performed in blocks 22–34 when vehicle 2 is moving differ from the operations performed in blocks 22–34 when vehicle 2 is stationary by the driver-selectable items in the menus only being selectable using control elements 10 on steering wheel 11, this to avoid distracting the attention of the driver of vehicle 2.

The operations performed in blocks 22–34 when vehicle 2 is moving also differ from the operations performed in blocks 22–34 when vehicle 2 is stationary by the first menu being reduced, i.e. containing fewer items than the first menu already described, and by each item in the first menu corresponding to a second menu comprising different items from those described previously.

For example, the reduced first menu may comprise items such as "radio" or "air conditioner" relative to control of the radio or air conditioner respectively; the second menu relative to the "radio" item may comprise items such as "volume", "mute", "high", "low", etc. indicating the possibility of adjusting the volume, turning off the sound, adjusting high and low pitch, etc.; and the second menu relative to the "air conditioner" item may comprise items such as "temperature", "recirculate", "up", "down", "front", etc. indicating the possibility of adjusting the set temperature, recirculating the air inside the passenger compartment, directing air flow up, down, towards the driver, etc.

Conversely, if the speed of vehicle 2 is above the threshold value (NO output of block 40), processing unit 7 disables the display of any type of menu and the use of "mouse" 6, and only allows the driver to perform elementary on-vehicle operations using control elements 10 on steering wheel 11, such as adjusting the volume of the radio directly from the steering wheel, turning off the sound of the radio ("mute"), recirculating air inside the passenger compartment, adjusting the air conditioner temperature, etc. (block 42).

Further operations not shown in FIG. 3 may also be performed.

In particular, on the basis of incoming information signals I indicating the state of vehicle 2, processing unit 7 provides for real-time changing the graphic representations of the instrument gauges and optical indicators shown on display units 3.

For example, in the case of the vehicle speed indicator, processing unit 7 provides for real-time changing the vehicle speed reading according to the vehicle speed signal, that is, changes the position of the gauge needle on the graduated scale if an analog gauge is selected, or changes the number displayed if a digital gauge is selected.

The same applies to all the other indicators shown on display units 3.

Moreover, processing unit 7 also provides, when display device 1 is installed on vehicle 2, or by the driver selecting the relative menu item, to select the language in which the information is represented, so that display device 1 may also be fitted to vehicles for export.

Regardless of the speed of vehicle 2, processing unit 7 also provides for automatically displaying diagnostic information to inform the driver, while the vehicle is moving, of more or less hazardous defects of vehicle 2, such as a fault in the braking system, a tendency of the vehicle to swerve, etc. To avoid distracting the driver's attention from the road, diagnostic information is displayed by means of short messages or images on display units 3, which may, for example, be flashed at low or high frequency to indicate the seriousness of the fault and amount of danger involved.

Processing unit 7 also provides for reconfiguring the functions assigned to control elements 10 on the steering wheel, to adapt them to the requirements of different, in particular left-handed, drivers.

Display device 1 according to the present invention may also cooperate with existing systems installed on and for already customizing certain functions of vehicle 2.

For example, some vehicles 2 are equipped with customization systems for memorizing, on a special magnetic or "microchip" card known as a "Smart Card" and which is issued to each possible driver of vehicle 2, the positions of the front seats, wing mirrors and inside rearview mirror adopted by that particular driver, and for setting the seats and mirrors to those positions when the "Smart Card" is inserted into a reader by the driver, or when the customization system detects the presence of the card on the driver and reads the data on it.

Display device 1 according to the present invention is also designed for telematic public service functions, which as yet have not come into operation.

For example, when real-time information concerning road traffic conditions or the on-road location of vehicle 2 become available in the near future, vehicle 2 may be equipped with a device for receiving this information and cooperating with processing unit 7 to display it on display units 3.

The advantages of display device 1 will be clear from the foregoing description.

In particular, display device 1 provides for adapting the size and style of the characters and graphic symbols shown on display units 3 according to the visual requirements of the driver.

Display device 1 provides for changing both the colour and the background colour of the characters and graphic symbols, to adapt the contrast between the two to the visual requirements of the driver, so that the information displayed is easier to read, especially in strong sunlight.

Display device 1 is highly reconfigurable, by permitting additions to the number of instrument gauges and optical indicators memorized in memory 5, and the integration of new functions not provided for at the design stage of display device 1.

Finally, operation of device 1 is particularly easy to learn, and the messages and information displayed are easy to read and understand.

Clearly, changes may be made to display device 1 as described and illustrated herein without, however, departing from the scope of the present invention.

For example, the visual danger signals supplied by display device 1 may be integrated with audio signals, and the various menu items may be selected in a manner other than that described, e.g. vocally.

To show which instrument gauges and which optical indicators can be changed, and what further information may be displayed, the first menu may comprise, as opposed to a number of items, a number of icons graphically representing the gauges, indicators and additional information.

Provision may be made for a different number of display units 3, which, as opposed to being fitted to dashpanel 4 of vehicle 2, may be fitted anywhere on instrument panel 9 as a whole. "Mouse" 6 may also be located in any convenient position within easy reach of the driver, e.g. on instrument panel 9 or steering wheel 11, and may be replaced by other analog data selecting devices, such as a "joystick" or a number of dedicated push-buttons (cursor keys) also located in any convenient position within easy reach of the driver.

What is claimed is:

1. A vehicle display device comprising:

display means, which can be fitted to an instrument panel of a vehicle, for displaying information, and modifiable with regard to information display parameters said information displayed on said display means including a first display set relating to vehicle operation and including optical indicators and gauges, a second display set which is a subset of the first display set and a third display set which is a subset of the second display set and comprises functional items including radio and air-conditioning controls;

control means for controlling said display means and modifying at least one of said display parameters; said control means comprising first enabling means for enabling a modification of the first set of said information display parameters by driver performable operation when the vehicle is stationary, second enabling means for enabling a modification of said second set of information display parameters by driver-performable operations when speed of the vehicle is above zero and below a threshold speed, and third enabling means for enabling a modification only of said third set of information display parameters by driver performable operations when vehicle speed exceeds said threshold value, said driver-performable operations being performed by selecting respective items or icons displayed on said display means.

2. A device as claimed in claim 1, wherein said display means comprises screen display means.

3. A device as claimed in claim 2, wherein said display means comprises color display means.

4. A device as claimed in claim 2, wherein said display means comprises liquid crystal display means.

5. A device as claimed in claim 1, wherein said control means comprises memorizing means for memorizing a number of predetermined representations of said information; selecting means for selecting said representations and generating at a respective output a number of selection signals indicating the selections made; and processing means for cooperating with said memorizing means and with said selecting means, and for controlling said display means to display selected representations.

6. A device as claimed in claim 5, wherein said selecting means comprises a "mouse".

7. A device as claimed in claim 6, wherein said "mouse" is a "track-ball" type.

8. A device as claimed in claim 5, wherein said selecting means comprises a "joystick".

9. A device as claimed in claim 5, wherein said selecting means is constructed to be fitted to a portion of said vehicle, adjacent to a gearshift lever of the vehicle.

10. A device as claimed in claim 5, wherein said selecting means is constructed to be fitted to a steering wheel of the vehicle.

11. A device as claimed in claim 5, wherein said selecting means is constructed to be fitted to the instrument panel of the vehicle.

12. A device as claimed in claim 5, wherein said processing means comprises:

first acquisition means for acquiring a first of said selection signals;

first reading means controlled by said first acquisition means and for reading in said memorizing means a first set of information associated with said first selection signal;

first control means receiving said first set of information and for generating first control signals for controlling said display means to display said first set of information;

second acquisition means for acquiring a second of said selection signals indicating information selected from said first set of information;

second reading means controlled by said second acquisition means and for reading in said memorizing means a second set of information associated with said second selection signal;

second control means receiving said second set of information and for generating second control signals for controlling said display means to display said second set of information;

third acquisition means for acquiring at least a third of said selection signals indicating information selected from said second set of information; and third control means receiving said selected information and for generating third control signals for controlling said display means on the basis of said selected information.

13. A device as claimed in claim 12, further comprising generating means for generating a moving-vehicle signal; said enabling means having an input connected to said generating means, and an output connected to said first, second and third acquisition means, to said first and second reading means, and to said first, second and third control means to generate a selective enabling signal in the presence of said moving-vehicle signal.

14. A display device as claimed in claim 1, wherein said different sets of driver performable operations which are enabled by said second enabling means comprises said second and third sets which are enabled depending on whether or not the speed of the vehicle has reached the threshold value.

15. A display device as claimed in claim 14, wherein said first set of information display parameters corresponds to a plurality of displays of said display means, said second set being enabled at vehicle speeds below said threshold value and corresponding to a reduced number of said display parameters of said first set and said third set being enabled at vehicle speeds above said threshold value and being a reduced number of display parameters of said second set.

16. A display device as claimed in claim 15, wherein said control means for said second and third sets includes control elements at the steering wheel of the vehicle.

17. A vehicle display device comprising:
a display screen for providing a visual display of information related to vehicle use;
said information displayed on said display means including a first display set relating to vehicle operation and including optical indicators and gauges, a second display set which is a subset of the first display set and a third display set which is a subset of the second display set and comprises functional items including radio and air-conditioning controls;
control means for altering appearance of the visual display on said screen;
a sensor to produce a signal indicative of vehicle speed; and processing means for blocking the altering of said appearance of the visual display of said first display set on said screen when the vehicle speed is above zero but below a given threshold value while enabling alteration of said second and third display sets on said screen while the vehicle speed is less than the threshold value, and for blocking the altering of said appearance of the visual display of both said first and said second display sets while enabling operation only of said third display set when vehicle speed exceeds said threshold value.

18. The vehicle display device of claim 17, wherein said visual display of vehicle operation comprises gauges and optical indicators.

19. The vehicle display device of claim 17, wherein said control means comprises operator controlled means and a memory.

20. The vehicle display device of claim 19, wherein a plurality of display screens are provided, each for a respective visual display related to vehicle use.

21. The vehicle display device of claim 20, wherein said memory stores a plurality of different appearances for said visual display, said operator controlled means being operative to select the desired appearance of said visual display.

22. The vehicle display device of claim 21, comprising a data selection unit from which selection can be made by said operator controlled means of a particular display screen and the particular appearance of the display thereon, said data selection unit provides information related to said further units on the vehicle which can be regulated by said operator control means.

23. A vehicle display device comprising:
display means, which can be fitted to an instrument panel of a vehicle, for displaying information, and modifiable with regard to information display parameters;
control means for controlling said display means and modifying at least one of said display parameters;
said control means comprising memorizing means for memorizing a number of predetermined representations of said information; selecting means for selecting said representations and generating at a respective output a number of selection signals indicating the selections made; and processing means for cooperating with said memorizing means and with said selecting means, and for controlling said display means to display selected representations;
said processing means comprising first acquisition means for acquiring a first of said selection signals; first reading means controlled by said first acquisition means and for reading in said memorizing means a first set of information associated with said first selection signal; first control means receiving said first set of information and for generating first control signals for controlling said display means to display said first set of information; second acquisition means for acquiring a second of said selection signals indicating information selected from said first set of information; second reading means controlled by said second acquisition means and for reading in said memorizing means a second set of information associated with said second selection signal; second control means receiving said second set of information and for generating second control signals for controlling said display means to display said second set of information; third acquisition means for acquiring at least a third of said selection signals indicating information selected from said second set of information; and third control means receiving said selected information and for generating third control signals for controlling said display means on the basis of said selected informations; generating means for generating a moving-vehicle signal; and enabling means having an input connected to said generating means, and an output connected to said first, second and third acquisition means, to said first and second reading means, and to said first, second and third control means to generate a selective enabling signal as a function of said moving-vehicle signal, and wherein said selective enabling signal is generated for said first, second and third control means when the moving-vehicle signal indicates the vehicle is stationary, said enabling signal is generated only for said second and third control means when the moving-vehicle signal indicates the vehicle is traveling at a speed below a threshold value whereby change of the display by said first control means is blocked, said enabling signal being generated only for said third control means when the moving-vehicle signal indicates the vehicle is traveling at a speed above the threshold value whereby change of the display by said first and second control means is blocked and only the third control means can change the display.

24. A vehicle display device comprising:

display means for displaying gauges and optical indicators related to the vehicle and its operation;

means for changing display of said gauges and optical indicators including a memory for storing different appearances of the displays on the display means;

an operator controlled means for selecting from said memory changes of the display on the display means;

a sensor of vehicle speed;

a plurality of functional units operated by said operator controlled means for changing operating characteristics of said functional units without display on said display means; and means for blocking change of display of the gauges and optical indicators when vehicle speed is above a threshold value while enabling changes of the operating characteristics of said functional units.

25. The vehicle display device of claim 24, wherein said operator-controlled means includes a first control element for said gauges and optical indicators and a separate control element for said functional units.

26. The vehicle display device of claim 24, wherein the threshold speed is zero for said gauges and optical indicators and a given vehicle speed for said functional units.

27. The vehicle display device of claim 24, wherein said gauges and optical indicators relate to vehicle operation.

28. The vehicle display device of claim 24, wherein said memory provides a first menu on a display unit for selecting one of said gauge and optical indicators and a second menu for selecting change in the selected gauge and optical indicators, said operator controlled means being operative to select from said first and second menus.

29. The vehicle display device of claim 28, wherein said means for changing display includes a processing unit responsive to items selected from said first and second menus to control the display on said display means.

30. The vehicle display device of claim 24, wherein said display means comprises a plurality of display screens for said gauges and optical indicators.

31. A vehicle display device comprising:

display means, which can be fitted to an instrument panel of a vehicle, for displaying information, and modifiable with regard to information display parameters;

control means for controlling said display means and modifying at least one of said display parameters; said control means comprising first enabling means for enabling a modification of a first set of said information display parameters by driver performable operation when the vehicle is stationary, and second enabling means for enabling a modification of different subsets of the information display parameters by driver performable operations according to the speed of the vehicle, said driver-performable operations being performed by selecting respective items or icons displayed on said display means such that when said first enabling means is operative the first set of said information display parameters can be modified by said control means and when said second enabling means is operative only said different subets of the of information display parameters can be modified, all of said sets of information display parameters being displayed regardless of the vehicle speed but only selected sets of information display parameters being modifiable depending on vehicle speed.

32. A device as claimed in claim 31, wherein all of said display sets are being related to vehicle operation and include gauges, optical indicators and functional units.

33. A device as claimed in claim 32, wherein said different subsets of display parameters are selectively disabled from being modified as a function of vehicle speed while still remaining displayed on said screen.

* * * * *